Feb. 11, 1964 A. J. RADCLIFFE, JR 3,121,173

LOGIC CIRCUITS

Filed May 14, 1959 4 Sheets-Sheet 1

INVENTOR.
A. J. RADCLIFFE, JR.

BY J. Warren Whitesel
ATTORNEY $R = A \overline{N}_1 \overline{N}_2 \overline{N}_3$ $R = (A+R) \overline{N}_1 \overline{N}_2 \overline{N}_3$ Feb. 11, 1964 A. J. RADCLIFFE, JR 3,121,173

LOGIC CIRCUITS

Filed May 14, 1959 4 Sheets-Sheet 3

LOGIC CIRCUITS

Filed May 14, 1959

United States Patent Office 3,121,173
Patented Feb. 11, 1964

3,121,173
LOGIC CIRCUITS

Arthur J. Radcliffe, Jr., La Grange, Ill., assignor to International Telephone and Telegraph Corporation, New York, N.Y., a corporation of Maryland
Filed May 14, 1959, Ser. No. 813,141
2 Claims. (Cl. 307—88)

This invention relates to logic circuits and more particularly to logic circuits using magnetic amplifiers.

Briefly, logic circuits are groups of electrical components interconnected to form standardized modules or building blocks which may be put together in any suitable combination to form an end product. One type of building block (called an "AND" gate) provides output signals only when a plurality of input signals coincide. Another type of building block (called an "OR" gate) provides output signals when any one or more of a plurality of input signals are present. Still another building block (called an "Inhibit") provides means for blocking signals under specific conditions. Yet another building block (called a "FLIP-FLOP") provides a memory, i.e. a bistable circuit is "flipped" by a first signal to one of its stable states where it remains to "remember" the occurrence of the "flipping" signal. A second signal "flops" the circuit to its second stable state where it "forgets" the "flipping" signal and "remembers" only the "flopping" signal.

Usually logic circuit modules or building blocks have no immediate use in and of themselves; however, when suitably combined an almost unlimited variety of circuits may be provided. For example, two simultaneous signals each representing the numeral "1" may be applied to the input terminals of an "AND" gate which produces an output signal representing the numeral "2," thereby making a simple addition. The output signal may control a "FLIP-FLOP" to remember the addition. If the numeral "2" is to be added to other integers, an input signal may originally represent either the numeral "2" or an addition of the numerals "1" and "1"; therefore, the output of the "FIP-FLOP," just described, may be connected to an input terminal of an "OR" gate along with a source of signals originally indicating the numeral "2." The "OR" gate conducts and gives an output signal indicating the presence of either an addition totalling the numerical value "2" or a signal originally meaning the numeral "2." The difficulty now encountered is that simultaneous signals on both input terminals of the "OR" gate may not indicate the numeral "2" but may indicate the numeral "4," i.e. an addition of two signals, each representing the numeral "2." Therefore, another building block may be connected to the input terminals of the "OR" gate to "INHIBIT" or block one input if the other input is in a conducting condition. The foregoing examples merely illustrate how logic circuits may be assembled.

In the past, logic circuits have featured electronic discharge devices such as tubes, transistors, and the like. However, each of these devices have certain drawbacks. For example, tubes have excessive power requirements and transistors have temperature limitations.

An object of this invention is to provide new and improved logic circuits.

Another object of this invention is to provide logic circuits utilizing magnetic amplifiers.

Still another object of this invention is to provide logic circuits having low power requirements.

Yet another object of this invention is to provide logic circuits for use under widely varying temperatures.

In accordance with this invention, a magnetic amplifier having a core with substantially square hysteresis loop characteristics is provided with reset and gate windings. Any suitable source of biasing potential may be provided—an A.C. generator, for example. However, it may be desirable to limit the output of the generator in order to reduce the size of the core. During half-cycles of a first polarity in the output of the A.C. generator, the gate winding is energized to bias the magnetic core toward saturation. During half-cycles of opposite polarity in the output of the A.C. generator, the reset winding is energized to erase or otherwise counteract the magnetic bias produced during half-cycles of the first polarity. Responsive to input signals, the effects of the reset winding are nullified. Thereafter, the magnetic core is saturated responsive to an occurrence of successive half-cyles of the first polarity.

Before the core is saturated, substantially all energy applied by the A.C. generator to the gate winding is utilized to magnetize or, stated otherwise, to bias the core toward magnetic saturation; therefore, the gate winding offers substantially high D.C. impedance. After saturation, substantially no energy is dissipated in magnetizing the core; therefore, the gate winding offers very little D.C. impedance so that a large output current flows from the A.C. generator to the load circuit. Since the output current flows only during half-cycles of one polarity, it is pulsating direct current; therefore, a relatively large capacitance is connected to the gate winding to filter the output and give a relatively smooth D.C. output potential.

A "FLIP-FLOP" may be provided by feeding back a part of the filtered D.C. output to simulate an input signal, thus maintaining the output signal indefinitely. In this manner, the magnetic amplifier "flips" to "remember" the occurrance of an input signal. Later, a third or inhibit winding may be energized to "erase" the magnetic bias to turn-off the amplifier, thus causing the amplifier to "flop" and "forget" the original input signal while "remembering" the inhibit signal.

The above mentioned and other objects of this invention together with the manner of obtaining them will become more apparent and the invention itself will be best understood by making reference to the following description of an embodiment of the invention taken in conjunction with the accompanying drawings in which.

Figure 5A:
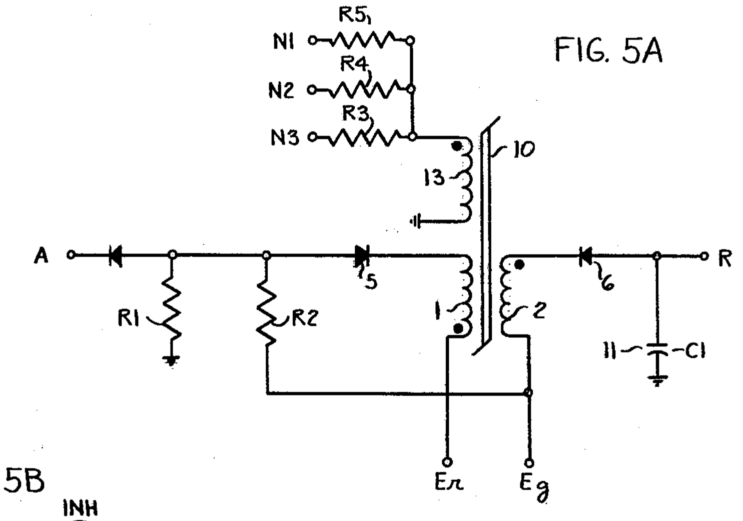
FIGS. 5–10 are typical examples illustrating the manner in which the basic concepts illustrated in FIGS. 1–4 may be combined to provide logic circuit modules.
Figure 5B:
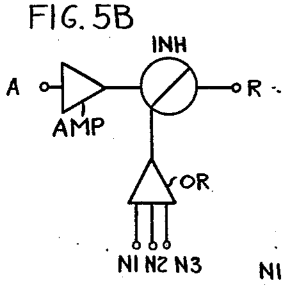

Each of the logic circuits (FIGS. 5–10) includes three parts. For example, FIG. 5A is an electrical circuit illustrating a manner in which components may be assembled to provide a module or building block. FIG. 5B illustrates the manner in which the electrical circuit of FIG. 5A may be represented graphically by standard logic symbols, each symbol being designated "OR," "AND" or "INH" (inhibit) as the case may be. Also associated with FIG. 5A is a Boolian algebra formula identifying the logic functions, i.e. a signal appears at output terminal R if an input signal is applied at terminal A and no signal is applied at terminals N1, N2, or N3. FIGS. 6–10 include similar representations.

Where possible, simple terms are used and specific items are described hereinafter to facilitate an understanding of the invention; however, it should be understood that the use of such terms and reference to such items are not to act in any manner as a disclaimer of the full range of equivalents which is normally given under established rules of Patent Law. For example, referring to FIG. 1, diodes 5, 6 and 12 are illustrated as rectfying devices; whereas, any unidirectional conductor may be used such as tubes, transistors, or the like. In a similar manner, a source of driving potential is shown as A.C. genreator 4; whereas, any suitable means such as a free running multivibrator or a motor driven interrupter may be used for alternately energizing windings 1 and 2. Moreover, devices such as magnetic cores, capacitors, etc. may be used to generate A.C. signals. Quite obviously, other examples could be selected to illustrate the manner in which the terms used and items described hereinafter are entitled to a wide range of equivalents.

*Brief Description*

FIGS. 1–4 illustrate the basic concepts used to provide logic circuits. Briefly, in each of the figures, there is shown a magnetic core 10 having a substantially square hysteresis loop; although, it has been found that as long as two stable states of saturation remain some squareness may be sacrificed to obtain a low coercive and a low magnetizing NI (ampere turns). Each of the cores has a plurality of windings associated therewith—dots being used near an end of each winding to indicate the polarity thereof.

Gate winding 2 is adapted to magnetize, or bias core 10 toward saturation in a given magnetic polar direction. Reset winding 1 and inhibit winding 13 are adapted to demagnetize, or bias core 10 away from saturation in the given direction. An A.C. generator 4 provides alternating half-cycles which serve as periodically reversing biasing potential. Half-cycles of one polarity (designated E*g*) energize gate winding 2 and half-cycles of reverse polarity (designated E*r*) energize reset winding 1. The circuit values and the frequency of generator 4 are such that a half-cycle of gating current "E*g*" does not provide enough magnetic effects to bias core 10 from its first or unsaturated state to its second or saturated state; however, the cumulative effects of gating current "E*g*" are such that two half-cycles cause core 10 to snap from its unsaturated to its saturated condition unless reset current "E*r*" is applied during alternate half-cycles. Winding 1 is provided with a sufficient number of turns to cause core 10 to snap from its saturated to its unsaturated condition in a single half cycle of energizing current (i.e.) unsaturated with respect to the given polar direction).

Figures 1, 1A, 1B, 1C, 2:
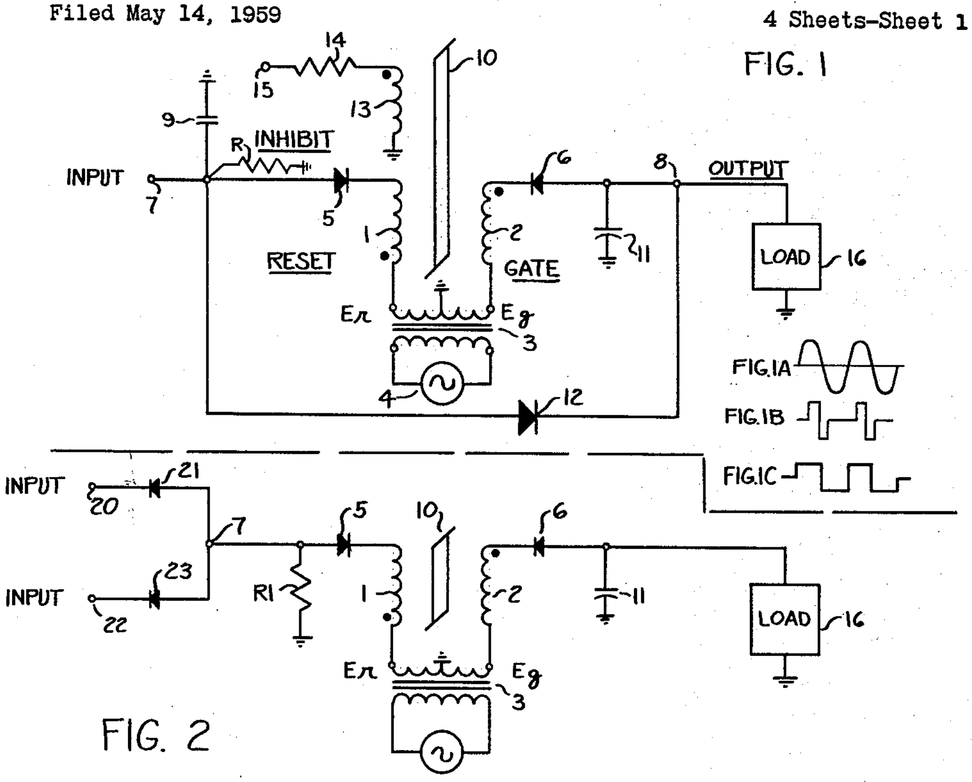
FIG. 1 illustrates the concepts of a magnetic amplifier adapted to provide the basic elements of a logic circuit.
FIGS. 1A, 1B and 1C illustrate optional outputs of generator 4.
FIG. 2 illustrates a manner in which a plurality of electrically isolated input terminals may be provided to make gating circuits.

Means is provided for reducing the size of the magnetic core by limiting the volt second product of the output of generator 4. The important thing about generator 4 is that it provides periodically changing control voltages. A sine wave may be used as shown in FIG. 1A; however, the excessive volt seconds in each half-cycle require the use of a needlessly large core. The same results may be had if the output signal of generator 4 is limited or reduced to a minimum by the use of pulses as shown in FIG. 1B, thereby permitting the use of small cores. No specific durations or amplitudes are implied for the waveform 1B; although, in a specific system, certain relationships relating amplitude, duration and the properties of windings 1 and 2 exist for best performance. It is within the scope of this invention to use any suitable signal such as the sine wave form (FIG. 1A), the limited pulse waveform (FIG. 1B), or the square waveform (FIG. 1C), the decision usually being one of the weighing the convenience and reliability of a source of sine waves, (e.g. commercial 60 cycle current) against the desirability of small core size. In any event, one half-cycle energizes the reset winding and the other half-cycle energizes the gate winding.

*Detailed Description*

In greater detail, generator 4 develops a biasing voltage which is applied periodically across transformer 3 to reset and gate windings 1 and 2 at opposite instantaneous polarities, i.e. during a first half-cycle, reset voltage "E*r*" is of negative polarity and the gating voltage "E*g*" is of positive polarity; whereas, during the second half-cycle, reset voltage "E*r*" is of positive polarity and gating voltage "E*g*" is of negative polarity. Diodes 5 and 6 are poled oppositely so that current can not flow simultaneously in both winding 1 and winding 2. That is, at the instant when reset voltage "E*r*" is of a negative polarity, current flows through diode 5 and winding 1. At the same instant, gating voltage "E*g*" is of positive polarity and no current flows through either diode 6 or winding 2. Since current does not flow in winding 2, there is no output to load 16. During the following half-cycle, reset voltage "E*r*" is positive, no current flows through diode 5 of winding 1, gating voltage "E*g*" is negative and current does flow through diode 6 and winding 2. Thus, a biasing magnetic flux is applied to the core alternately by windings 1 and 2 in accordance with the driving or biasing current emanating from generator 4.

At the instant being described, it is assumed, that core 10 is in its non-saturated state and that reset voltage "E*r*" is positive; therefore, no current flows through winding 1 and diode 5. Gate voltage "E*g*" is negative; therefore, current flows through winding 2 and diode 6.

Responsive to the voltage across winding 2, core 10 is magnetically biased toward saturation in the given magnetic polar direction; however, in the single half-cycle being described, core 10 is not magnetized sufficiently to be triggered to its second or saturated state. Also during the half-cycle being described, winding 2 offers relatively great D.C. resistance to current flow; substantially all of the voltage that is introduced through transformer 3 is being absorbed across winding 2 and none across load 16. When the half-cycle being described terminates, core 10 retains the magnetic characteristics to which it has been biased.

Next, it is assumed that the control current from generator 4 is in the half-cycle having a polarity which is opposite to that just described. Reset voltage "E*r*" is negative and gate voltage "E*g*" is positive. Winding 1 is energized responsive to current flow through diode 5 while diode 6 blocks current flow in winding 2. Since opposite magnetic effects are produced by windings 1 and 2, the magnetization of core 10 responsive to an energization of winding 2 is erased by energization of winding 1. Core 10 is now biased to its unsaturated condition with respect to the given magnetic polar directions.

The following half-cycles repeat the process, i.e. core 10 is biased toward saturation by current which flows in winding 2 and biased away from saturation by current which flows in winding 1.

Next, let it be assumed that an input voltage is applied at point 7 which is equal to or more negative than reset voltage "E*r*," thereby back biasing diode 5. Capacitor 9 is provided to store the input signal, as required. For example, if generator 4 provides a sine wave output as shown in FIG. 1A or a square wave output as shown in FIG. 1C, the timing may not be too critical and capacitor 9 may not be required. On the other hand, if generator 4 provides minimum duration control pulses as shown in FIG. 1B, capacitor 9 may be required to store the input signal and insure a coincidence of input and reset signals by, in effect, spreading the period of time during which the input signal may be effective. Resistance R may be provided to discharge capacitor 9 before the occurrence of complete cycle in the output of generator 4.

Under the conditions assumed above, no current may flow in winding 1 due to the blocking effect of diode 5. The magnetic effects of the energization of winding 2 during the previous half-cycle are not erased and core 10 remains biased toward, but not in a saturated condition. Current flows through gate winding 2 on the half-cycle after the reset voltage is blocked by an input signal. Once again, core 10 is biased toward saturation, the magnetic effect being cumulative to that of the preceding half-cycle. Responsive thereto, core 10 is snapped to its saturated condition whereupon the voltage introduced into the system from generator 4 is no longer blocked by winding 2. Thus, the effective D.C. resistance of winding 2 falls from a relatively high value to an extremely low value. The input signal may be quite long or may be a momentary pulse; however, as long as the input signal remains at point 7, reset voltage "Er" is ineffective, winding 2 offers substantially no resistance, and current is delivered to load 16 during each half-cycle in the output of generator 4 which may be conducted through diode 6. Hence, the output of the magnetic amplifier is pulsating D.C.

While a pulsating output may be of value in some circuits, in the subject logic circuits, it is more desirable to provide a smooth D.C. output. Therefore, a relatively large capacitor 11 is connected to filter the output.

One of the basic building blocks in logic circuits is a "FLIP-FLOP" circuit having two stable states whereby one signal turns the circuit "on" and a second signal turns the circuit "off." In order to provide a "FLIP-FLOP" circuit, a small portion of the rectified half-cycle output signal is bled-off at point 8 and fed-back through diode 12 to input 7 for providing a locking potential which prevents reset voltage "Er" from being conducted through diode 5. Thus, core 10 remains in a saturated condition and output current is delivered to load 16 without regard to the continuation of the input signal at point 7. To turn-off the circuit, a suitable signal may be applied at point 15, thus energizing winding 13 to demagnetize core 10. Thereafter, if no input signal is applied at point 7, the circuit is quiescent and substantially no current flows through winding 2 to load 16.

Thus, it is seen that FIG. 1 discloses a "FLIP-FLOP" circuit wherein substantially no current is delivered to load 16 until a momentary input signal is applied at point 7. Thereafter, a relatively smooth direct current output is transmitted as a result of the filtering effects of capacitor 11. Once the circuit is turned-on, feedback through diode 12 holds it "on." Responsive to an application of a control signal at point 15, core 10 is biased to its unsaturated condition and the output current is turned off.

FIG. 2 discloses how gate circuits may be made by providing a plurality of electrically isolated inputs. Briefly, the amplifier of FIG. 2 is substantially the same as the amplifier of FIG. 1 except that there is no "FLIP-FLOP," i.e. no winding 13, and no feedback circuit 12. As previously described in connection with FIG. 1, in its quiescent state, the magnetic amplifier delivers substantially no current to load 16 since core 10 remains unsaturated and substantially all of the voltage that is applied through transformer 3 is absorbed by changing the magnetic state of core 10. The path for reset voltage "Er" extends from ground through the center tap of the upper winding of transformer 3 where energy from generator 4 is introduced by transformer action, winding 1, diode 5 and resistor R1 to ground. Resistor R1 is provided first to help reduce power consumption by eliminating the need for energizing a preceding circuit, second, to allow isolation of input terminals 20 and 22 and, third, to allow full use of all power in the input signal. It has been found that resistor R1 may be replaced by a diode or by a winding, as required.

If a signal is applied at either point 20 or point 22, the potential on the left side of diode 5 is such that reset voltage "Er" is effectively blocked. Removal of an input signal from point 20, without removal of an input signal from point 22 (and vice versa) does not have any effect; therefore, FIG. 2 provides an "OR" gate. It is only when input signals are removed from both input terminals 20 and 22 that the magnetic amplifier of FIG. 2 is turned "off."

Diodes 21 and 23 are provided to isolate the input signals. For example, it is not possible for a direct current to flow from point 20 through diode 21, diode 23, and point 22. That is, current having a polarity which is passed by diode 21 may not be passed by diode 23. On the other hand, input signals of the same polarity applied to points 20 and 22 may be passed to point 7.

Figure 3:
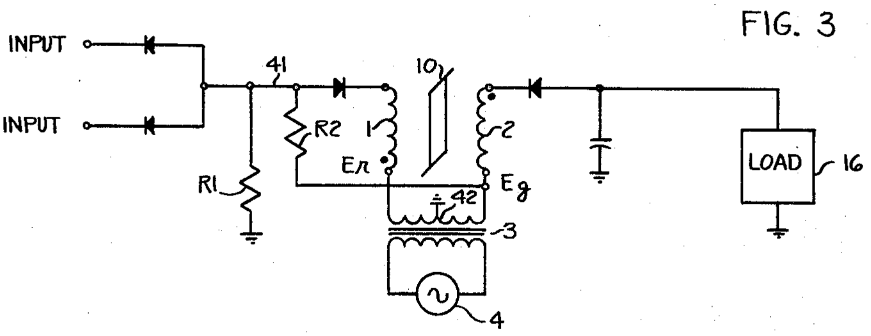
FIG. 3 shows a manner in which the magnetic amplifier may be modified to provide a more efficient control or reset circuit.
Figure 4:
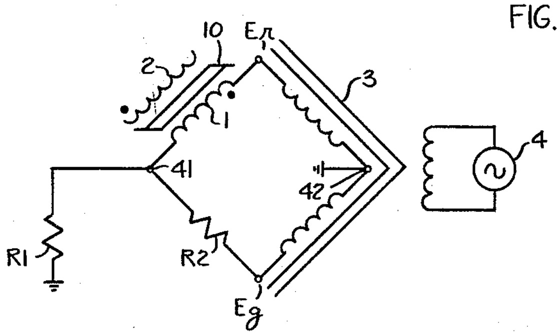
FIG. 4 is a redrawing of FIG. 3 in the configuration of a balanced bridge circuit to facilitate an understanding of the improved efficiency of the circuit.

FIG. 3 shows a magnetic amplifier having increased reset efficiency (FIG. 4, is a redrawing of a portion of FIG. 3). Feedback resistor R2 is provided to introduce bias in a balanced bridge during the half-cycles when gating voltage "Eg" is effective. That is, a balanced bridge circuit is provided wherein two arms of the bridge are the two halves of the secondary winding of transformer 3. One arm of the bridge is reset winding 1 and the other arm of the bridge is control means in the form of resistor R2. When the bridge is in balance there is zero potential difference between points 41 and 42. Hence, all of the reset voltage "Er" is forced through winding 1. Resistor R1 is not required if the bridge is in perfect balance. However, since perfect balance is not possible, any potentials appearing at point 41 are connected to ground through resistor R1.

The foregoing explanations of the circuit principles may be applied in any desired manner to provide a wide variety of more sophisticated circuits. The following is a description of a few typical applications; however, it should be understood that those skilled in the art may provide any number of combinations according to particular needs. In FIGS. 5–10, components corresponding to those described above in connection with FIGS. 1–4 bear the same reference numerals.

Briefly, FIG. 5A illustrates a circuit similar to that shown in FIG. 3, plus an inhibit winding 13 such as that described above in connection with FIG. 1. During quiescent periods, a signal source applies voltages "Er" and "Eg" of alternate polarity to reset and gate windings 1 and 2 respectively. Diodes 5 and 6 alternately permit current to flow in each of the windings. When a signal is applied at terminal A, the reset voltage "Er" does not erase the magnetic effects of the preceding half-cycle; therefore, core 10 saturates and output is delivered to the terminal R. If a signal is applied to any of the terminals N1, N2, or N3, inhibit winding 13 is energized to prevent core 10 from saturating despite the occurrence of a signal at terminal A. Hence, it is seen that (as indicated by FIG. 5B) the magnetic amplifier conducts if a signal is applied at terminal A and not at any of the three "OR" gate inputs. The circle marked "INH" indicates inhibit means such as winding 13 and the diameter line is slanted to indicate that it is the output of the amplifier which is blocked.

Figure 6A:
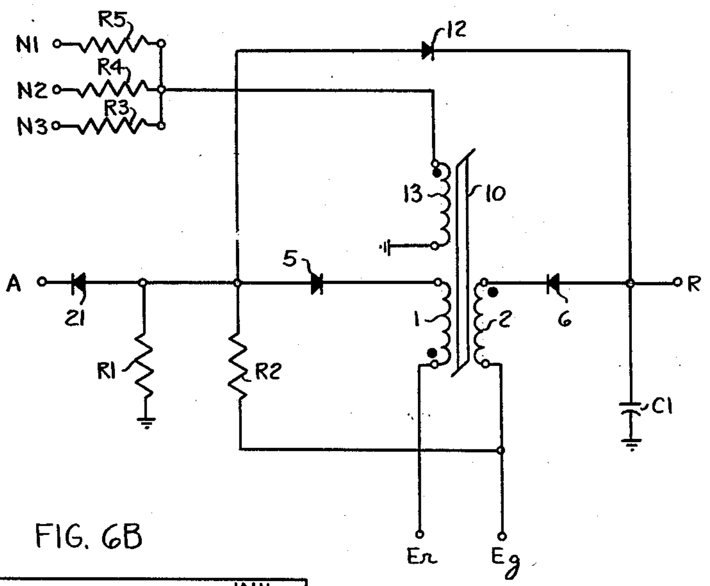
Figure 6B:
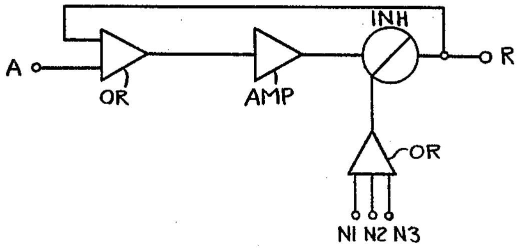

FIG. 6A illustrates a "FLIP-FLOP" with a three input "OR" gate inhibitor as indicated by FIG. 6B and by the Boolian algebra. That is, an output is delivered at terminal R when a signal is applied at either A or R and not at any of the N terminals. As described above in connection with FIG. 1, during the quiescent state, alternate energizations of windings 1 and 2 merely magnetize and demagnetize core 10. When a signal is applied at terminal A, the reset voltage "Er" is blocked and does not erase the magnetic bias resulting from a preceding half-cycle; therefore, on the next half cycle, winding 2 conducts to saturate core 10 and deliver an output to terminal R. Thereafter, feedback through diode 12 maintains a blocking potential on the left side of diode 5, thus preventing the reset winding from demagnetizing core 10. The circuit continues to deliver output at terminal R until an inhibiting signal appears on any of the terminals N1–N3 at which time current flows in winding 13 to demagnetize core 10. Since diodes 12 and 21 are biased in the same effective direction relative to the reset winding 1, an input signal at terminal R has the same effect as a signal at terminal A.

A comparison of the logic diagrams shown in FIGS. 5B and 6B illustrates how the same basic circuit may be modified by an additional element to provide additional features, as required. For example, both FIGS. 5B and 6B show an amplifier with a three input "OR" gate inhibitor. If the same device is required in connection with a "FLIP-FLOP," merely connect the feedback circuit including diode 12 to an input "OR" gate.

Figures 7A, 7B, 8A, 8B:
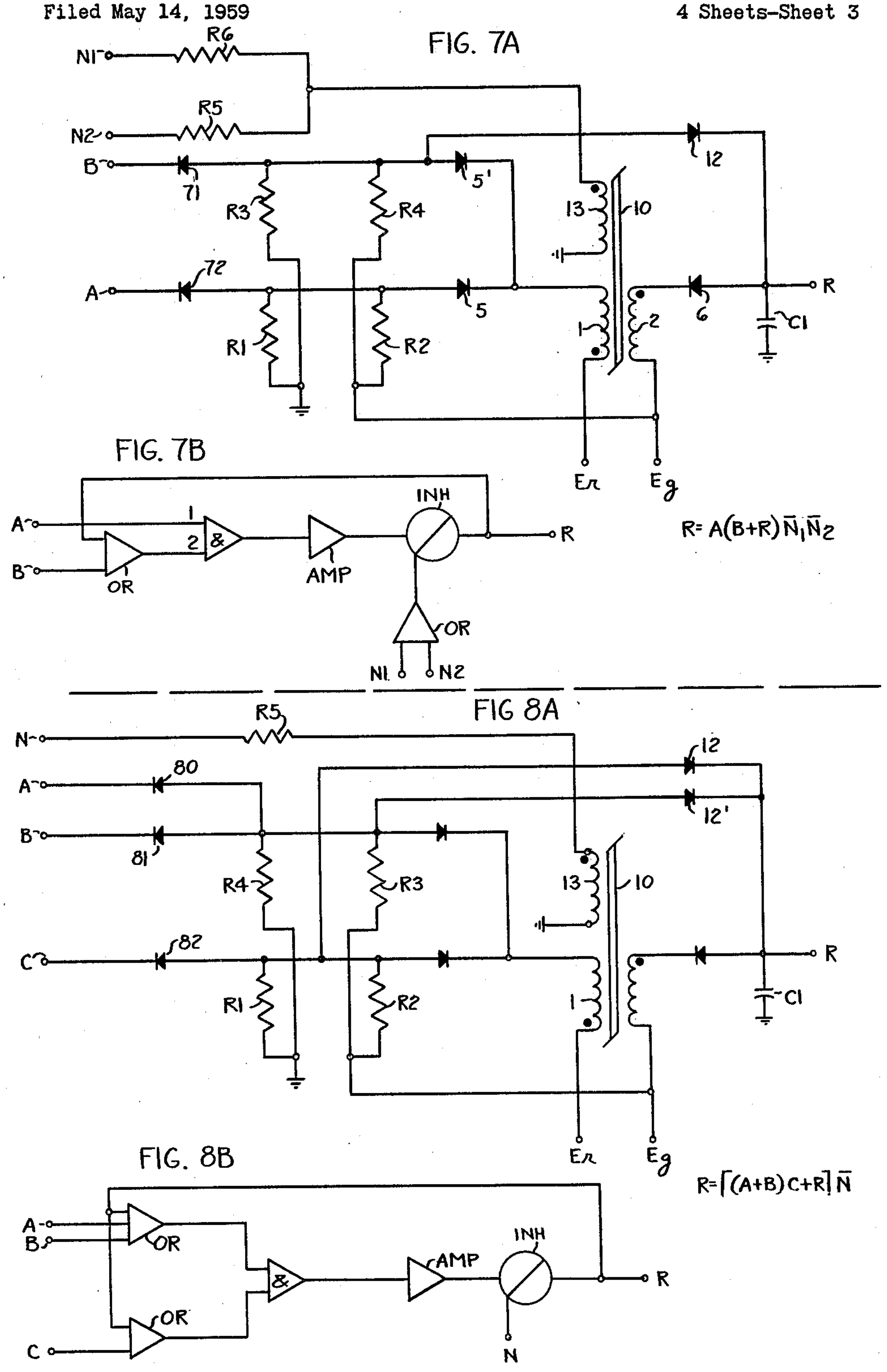

As indicated by FIG. 7B and the Boolian algebra, FIG. 7A illustrates a combination wherein an output signal is delivered at terminal R if input signals are applied to terminals A and B or R and not to terminals N1 or N2. As described above, in the quiescent state, windings 1 and 2 conduct alternately to bias and erase core 10. An application of a signal at terminal A alone has no effect since a path for reset signal "Er" may be traced through diode 5′, and resistor R3 to ground. In a similar manner, a signal on terminal B alone has no effect since the reset signal may be conducted through diode 5 and resistor R1 to ground. However, if input signals appear on both terminals A and B, reset voltage "Er" is blocked and core 10 is not demagnetized on alternate half-cycles. On the next half-cycle, gate voltage "Eg" effectively energizes winding 2 to saturate core 10. Thereafter, an output signal is delivered to terminal R. Since diode 12 is poled in the same direction as diode 71, (relative to the reset winding 1) a signal applied at terminal R is the equivalent of a signal applied at terminal B, thus providing a "FLIP-FLOP" circuit. If inhibit winding 13 is energized from either terminal N1 or N2 core 10 is demagnetized to terminate or prevent output. Likewise the circuit reverts to the off condition if the signal at input A is removed.

FIG. 8 is a combination of "AND" gates and "OR" gates as shown in FIG. 8B. FIG. 8 is similar to FIG. 7 since a signal must be applied to both terminals B and C if current in reset winding 1 is to be blocked, thus providing an "AND" gate. FIG. 8 differs from FIG. 7 since terminal A is equivalent to terminal B and thereby provides an "OR" gate preceding the "AND" gate. Diodes 12 and 12′ are poled in the same direction as input diodes 80–82 (relative to the reset winding 1) to provide feedback and thus a "FLIP-FLOP circuit. As in previously described circuits, an application of a potential to terminal N inhibits the output of the magnetic amplifier.

Figures 9A, 9B:
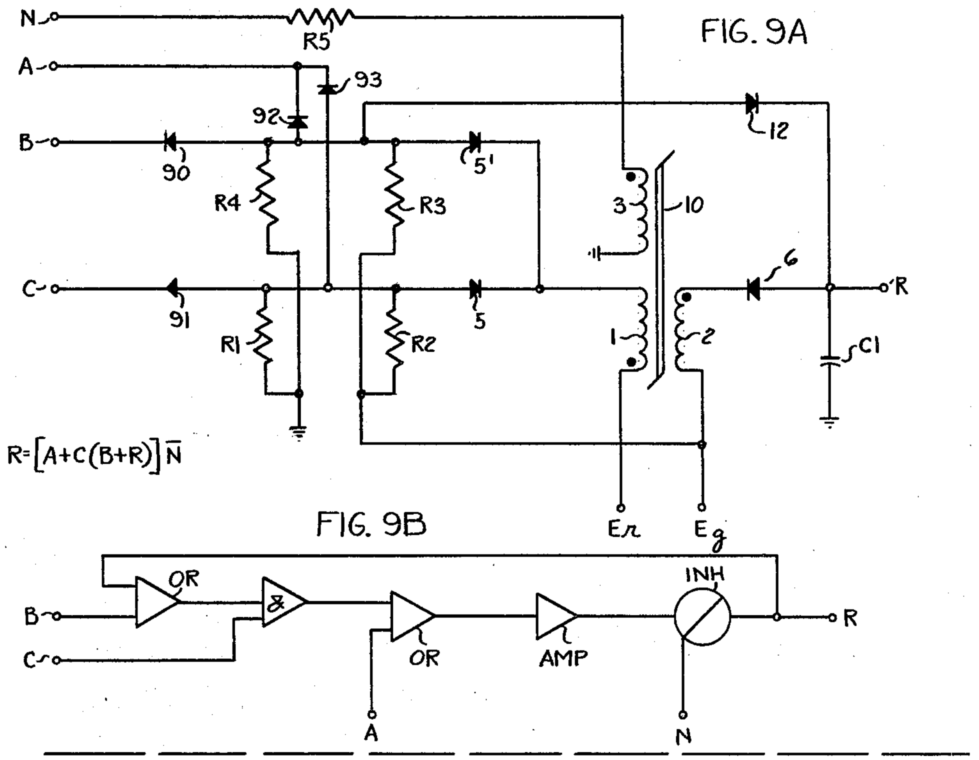

FIG. 9 illustrates a combination of an "OR" gate, an "AND" gate, an "OR" gate, and amplifier and inhibitor. In its quiescent state, signals "Er" and "Eg" alternately energize windings 1 and 2 as described above in connection with FIG. 1. If a blocking signal is applied to terminal C, a by-pass for reset voltage "Er" may be traced through diode 5′ and resistor R4 to ground. Conversely, a signal applied to terminal B does not prevent a flow of reset current through diode 5. Therefore, both terminals B and C must have input signals applied thereto if the amplifier is to supply an output signal; hence, terminals B and C comprise an "AND" gate. Once output current begins to flow through winding 2 and terminal R, feedback through diode 12 maintains conductivity to provide a "FLIP-FLOP" circuit. As previously described, inhibit winding 3 has a demagnetizing effect so that an application of a signal at terminal N turns the amplifier "off." Terminal A provides an "OR" gate to permit a control which is alternative to that of the "AND" gate, i.e. an application of a signal at terminal A is conducted through diodes 92 and 93 to block reset voltage "Er" without regard to any signals which may be applied to terminals B and C.

Figures 10A, 10B:
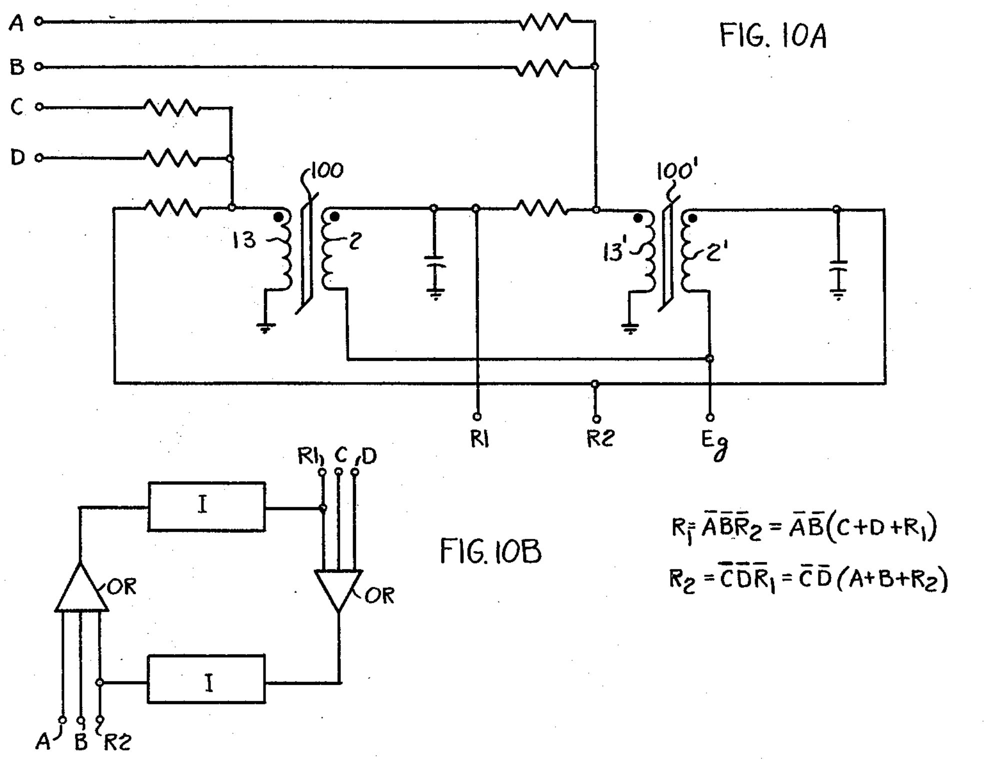

FIG. 10 illustrates an inverter circuit ring. There are two output terminals R1 and R2. There is no reset winding corresponding to winding 1 of FIG. 1. There are only gate windings 2 and 2′ and inhibit windings 13 and 13′. The first time that a gating signal is applied to terminal "Eg," cores 100 and 100′ are biased toward saturation. The second time that a signal is applied at gating terminal "Eg," the first core to saturate gains control and inhibits the other from proceding in the "on" direction. If a signal is applied at terminals C or D, inhibit winding 13 is energized to bias core 100 to an unsaturated condition, thereby cutting-off the delivery of output power to terminal R1 and causing power delivery to R2. Conversely, if a signal is applied to terminals A or B, the delivery of output power to terminal R2 is cut-off, and R1 is energized. Thus, either R1 or R2 is energized and the circuit retains the state resulting from the most recent input.

From the foregoing, it is seen that the subject invention relates to principles which may be used to provide building blocks or logic circuits of any suitable design. The building blocks may then be assembled according to particular circuit requirements. While only five species have been shown in FIGS. 5–10, it should be obvious that input, output, and inhibit windings, may be combined with feedback circuits, and the like to provide many difference combinations.

While the principles of the invention have been described in connection with the specific apparatus, it is to be clearly understood that this description is made only by way of example and not as a limitation on the scope of the invention.

I claim:

1. In an electrical logic circuit, a magnetic amplifier, means comprising a first "or" gate having a plurality of input terminals and at least one output terminal, means comprising an "and" gate having at least two input terminals and at least one output terminal, means for connecting said output terminal of said first "or" gate to one of said input terminals of said "and" gate, means for applying control signals to the other of said input terminals of said "and" gate, means for connecting said output terminal of said "and" gate to bias said magnetic amplifier to conductivity thereby providing an output signal, feedback means for applying at least a portion of said output signal to at least one of said input terminals associated with said first "or" gate, means for inhibiting said amplifier thereby blocking said output signal, means comprising a second "or" gate having a plurality of input terminals, and means responsive to signals applied to any input terminal of said second "or" gate for rendering said inhibiting means effective.

2. The electrical logic circuit of claim 1 wherein said magnetic amplifier comprises a magnetic core having two stable states of saturation, supply means for providing control voltage having first and second half-cycles, means responsive to said first half-cycles for providing magnetizing effects to bias said core toward a first of said states of saturation, means responsive to said second half-cycles for reducing said magnetizing effects produced during said first half-cycles for biasing said core toward a second of said states of saturation, said first "or" gate comprising a plurality of electrically isolated input terminals for changing the magnetizing effects of said second half-cycles, said "and" gate comprises an electrical path which is alternative to said input terminals, said inhibiting means comprises means for erasing said magnetizing effects produced during said first half-cycles and said second "or" gate comprising a plurality of control terminals associated with said inhibiting means.

References Cited in the file of this patent

UNITED STATES PATENTS

| | | |
|---|---|---|
| 2,747,109 | Montner | May 22, 1956 |
| 2,760,085 | Van Nice | Aug. 21, 1956 |

| | | |
|---|---|---|
| 2,832,066 | Perkins | Apr. 22, 1958 |
| 2,871,442 | Perkins | Jan. 27, 1959 |
| 2,901,733 | Eckert | Aug. 25, 1959 |

OTHER REFERENCES

"Digital Computer Components and Circuits" (Richards), published by D. Van Nostrand Co., Inc., 1957 (page 246 relied on).